(12) United States Patent
Petrzik et al.

(10) Patent No.: US 7,591,755 B2
(45) Date of Patent: Sep. 22, 2009

(54) HYDRAULIC CIRCUIT FOR A TOROIDAL TRANSMISSION

(75) Inventors: Gunther Petrzik, St. Georgen (DE); Andreas Wild, Unterensingen (DE); Lothar Wolf, München (DE); Thomas Kress, Dachau (DE)

(73) Assignees: GETRAG Getriebe-und Zahnradfabrik Hermann Hagenmeyer GmbH, Untergruppenbach (DE); Cie KG and Bayerische Motorenwerke Aktiengesellschaft, Untergruppenbach (DE)

( * ) Notice: Subject to any disclaimer, the term of this patent is extended or adjusted under 35 U.S.C. 154(b) by 211 days.

(21) Appl. No.: 11/598,215

(22) Filed: Nov. 10, 2006

(65) Prior Publication Data

US 2007/0167274 A1 Jul. 19, 2007

Related U.S. Application Data

(63) Continuation of application No. PCT/EP2005/004970, filed on May 7, 2005.

(30) Foreign Application Priority Data

May 11, 2004 (DE) ....................... 10 2004 024 031

(51) Int. Cl.
*F16H 15/38* (2006.01)

(52) U.S. Cl. .......................... 476/10; 476/40

(58) Field of Classification Search .................. 476/10, 476/40, 41, 42, 46
See application file for complete search history.

(56) References Cited

U.S. PATENT DOCUMENTS

| 6,162,144 | A | 12/2000 | Haka et al. |
| 6,634,977 | B2 | 10/2003 | Ooyama |
| 2004/0092359 | A1 | 5/2004 | Imanishi et al. |

FOREIGN PATENT DOCUMENTS

| DE | 195 34 391 A1 | 3/1997 |
| EP | 0 866 242 A2 | 9/1998 |
| EP | 1 092 895 A2 | 4/2001 |
| GB | 2 369 164 A | 5/2002 |

OTHER PUBLICATIONS

Excerpt from website http://www.torotrak.com/, dated Feb. 24, 2007, 2pgs.

*Primary Examiner*—William C Joyce
(74) *Attorney, Agent, or Firm*—Knobbe, Martens, Olson & Bear, LLP

(57) ABSTRACT

A hydraulic circuit for a toroidal transmission comprises: a) a single pump, b) a main pressure controller connected to the pump to generate a main line pressure in a main line, c) a roller controller connected to the main line to generate two roller control pressures from the main line pressure, d) at least one hydraulic roller actuator for adjusting a roller in a toroidal space set up by two disks, the roller actuator being connected to the roller controller, e) a disk controller connected to the main line, a disk control pressure being generated in the disk controller from the main line pressure, and f) at least one hydraulic disk actuator for axially adjusting at least one of the disks, the disk actuator being connected to the disk controller.

7 Claims, 2 Drawing Sheets

HYDRAULIC CIRCUIT FOR A TOROIDAL TRANSMISSION

CROSS-REFERENCE TO RELATED APPLICATIONS

This application is a Continuation Application of International patent application PCT/EP2005/004970 filed May 7, 2005 which claims priority of German patent application DE 10 2004 024 031.

BACKGROUND OF THE INVENTION

The present invention relates to a hydraulic circuit for a toroidal transmission.

In the field of transmissions, in particular transmissions for motor vehicles, there is a trend toward continuously variable transmissions. Continuously variable transmissions generally allow the internal combustion engine, which is usually arranged upstream in motor vehicles, to operate independently of the respective vehicle speed within an advantageous engine speed range. As a result, the efficiency of the drive train, which is formed by the internal combustion engine and the continuously variable transmission, is improved. Continuously variable transmissions further provide a particularly high level of driving comfort.

Within continuously variable transmissions, so-called toroidal transmissions have a particular importance, namely, in particular, due to their higher torque capacity relative to continuously variable belt drive transmissions (CVTs).

Within toroidal transmissions, the Torotrak™ system is of particular importance (see www.torotrak.com). This transmission does not require a starting clutch on the input side or hydrodynamic torque converters. It is a full toroidal transmission, which is generally constructed in the manner of a countershaft transmission. A variator ensures a continuously variable adjustment of the transmission ratio. The variator has a drive disk and an output disk, which define a toroidal space. Within the toroidal space, three rollers, which are designed to transmit torque from the drive disk to the output disk, are distributed around the periphery. For the adjustment of the transmission ratio, the rollers are spatially adjusted within the toroidal space.

The adjustment of the rollers is carried out via double-acting hydraulic cylinders. With the Torotrak system, the actuator system required for supporting the torque load is also of hydraulic design, for supporting at least one of the disks in the axial direction. Furthermore, two transmission ratio ranges may be set by two clutches. The actuation of the clutches is also carried out via hydraulic actuator systems. Finally, the torque transmission from the drive disk to the rollers and/or from the rollers to the output disk requires a high cooling capacity, which is generally provided by lubricating oil and/or cooling oil. It also has to be ensured that a lubricating film does not rupture in the region of the contact ellipses between the rollers and the disks.

A hydraulic circuit for such a toroidal transmission is known from GB-A-2 369 164.

The hydraulic circuit known from this publication comprises a tandem pump which delivers oil in two separate hydraulic circuits. The one hydraulic circuit is respectively connected to a chamber of the double-acting piston/cylinder arrangements of the respective rollers. The other hydraulic circuit is connected to the other respective chambers.

In this connection, one piston/cylinder unit is configured as a "master" for each of the hydraulic circuits. Variable throttles are configured therein. During normal operation, therefore, the oil flows through the corresponding chambers into respective proportional pressure control valves. During normal operation, said pressure control valves control the pressure in the chambers (and therefore the force exerted by the respective roller actuators). The master piston/cylinder arrangement has an effect on the throttle function thereof only in the end of travel range. In this connection, the piston head throttles the applied volume flow by closing the outlet opening in the cylinder cap. In this manner, the pistons of these piston/cylinder arrangements protect the actuator system from mechanical stops. These "hydraulic stops" at the end of travel of the roller actuator system represent effective end of travel damping. This end of travel damping requires a hydraulic capacity, in contrast to conventional end of travel damping systems. The end of travel damping additionally allows the interaction with the axial pressure against the variator (disk actuator) to be further maintained. The variator which is hydraulically controlled in this manner is technically considered to be reliable.

Control devices for controlling the range clutches may, on the one hand, be connected downstream of the master piston/cylinder arrangements. In this case, a hydraulic-mechanical connection may occur (for example by means of an alternating check valve ("shuttle valve")). This compares the pressures before the proportional pressure control valves. The respectively higher pressure serves as a source for the contact pressure of the range clutches operated.

On the other hand, it is also possible to divert the pressure for the range clutches directly from the pressures provided by the respective tandem pump.

A second shuttle valve is provided for the hydraulic supply of a disk controller for hydraulically pressing against at least one variator disk in the axial direction ("end load system"). This compares the pressures which are provided by the tandem pump. The higher pressure serves as a source for pressing against the disk.

A lubricating oil circuit is connected to the hydraulic control circuit. The lubricating oil circuit requires a flow pressure for overcoming the hydraulic resistances. In this connection, the hydraulic resistances of an external cooling system and the parallel resistances of the rollers, disks, bearings and gear set have to be overcome.

This known hydraulic circuit is robust relative to mechanical disturbance variables from the drive train. This is achieved by two separate hydraulic circuits with applied volume flows. The respective mechanical hydraulic connection ensures reliable operation. Reliable emergency operation is, therefore, able to be implemented.

Nevertheless, the hydraulic concept created involves hydraulic interaction at a hydraulic capacity level. In this connection, the pressure from the volume flow, which determines the roller actuator system, is directly used for the disk control and clutch control. Furthermore, two pumps (tandem pumps) are required.

A further hydraulic control system is known from DE 698 07 134 T2 (corresponding to EP 0 866 242 B1) for a continuously variable toroidal transmission.

In this known hydraulic circuit, a single pump is provided. In a main pressure line, a first main pressure is regulated by means of a solenoid valve. Furthermore, a secondary pressure is generated from the pump pressure in a secondary pressure line, and more specifically by means of a further solenoid valve. The two pressures are used for the transmission ratio control (roller actuator system). Furthermore, a lubricating oil flow is diverted from the pump pressure which is partially directed via a cooler. The lubricating oil pressure is also regulated.

A respective clutch control pressure is diverted from the main pressure in the main pressure line by means of appropriate solenoid valves, to actuate range clutches of the toroidal transmission.

The axial contact pressure on the variator disks is carried out via a mechanical spring arrangement.

A further hydraulic control concept with a tandem pump is known from DE 195 34 391 A1.

BRIEF SUMMMARY OF THE INVENTION

In view of the above background to the invention, the object of the present invention is to provide an improved hydraulic circuit for a toroidal transmission.

This object is achieved by a hydraulic circuit for a toroidal transmission, which comprises:

a single pump, a main pressure controller which is connected to the pump for generating a main line pressure in a main line, a roller controller which is connected to the main line, two roller control pressures being generated in the roller controller from the main line pressure, at least one hydraulic roller actuator for spatial adjustment of a roller in a toroidal space which is set up by two disks, the roller actuator being connected to the roller controller, a disk controller which is connected to the main line, a disk control pressure being generated in the disk controller from the main line pressure, and at least one hydraulic disk actuator for axially adjusting at least one of the disks, the disk actuator being connected to the disk controller.

In the hydraulic circuit according to the invention, only a single pump is provided. A main line pressure is generated from the pressure generated by the pump. On the one hand, the control unit and actuator system of the rollers are supplied thereby. On the other hand, the control unit and actuator system for the disks are supplied thereby. As a result, there is no hydraulic interaction between these separate circuits. The roller control pressures are independent of the disk control pressure. In contrast to the prior art, between these pressures there is no fixed pressure ratio which is predetermined by the geometry. The efficiency may be also optimized by separate control of the disk control pressure, in particular by an active control. The operational reliability is also increased as the disk control pressure is controlled, preferably feedback regulated, on the basis of the high main line pressure.

The hydraulic systems are controlled and/or regulated separately from one another. As a result, the individual systems and their functionality may be optimized.

It is particularly advantageous if a clutch pressure controller is provided which generates a clutch pressure in a clutch line from the main line pressure.

In this connection also, a further secondary hydraulic system (for one or more clutches) is provided, decoupled from the other secondary hydraulic systems (for the rollers and/or disks).

By means of the measures for diverting the clutch pressure from the main line pressure, an economically efficient cascade arrangement is provided.

In this connection, it is particularly advantageous if a clutch control device is provided which is connected to the clutch line, a clutch control pressure being generated in the clutch control device from the clutch pressure.

In this connection, the clutch control device is supplied with the clutch pressure from the clutch line. A control pressure is generated therefrom for controlling a clutch, for example a range clutch or a plurality of range clutches, of the toroidal transmission.

As a result, it is therefore advantageous if at least one hydraulic clutch actuator is provided for actuating at least one range clutch, the clutch actuator being connected to the clutch control device.

According to a further preferred embodiment, a cooler pressure controller is provided which generates a cooling pressure in a cooling line from the clutch pressure.

By means of these measures, the pressure controller cascade is extended. The cooling pressure is thus generated from the clutch pressure which, in turn, is generated from the main line pressure.

In this connection, preferably one cooler is provided which is connected to the cooling line.

According to a further preferred embodiment, a lubricating oil pressure controller is provided which generates a lubricating oil pressure in a lubricating oil line from the cooling pressure.

This also leads to an extension of the pressure controller cascade. The lubricating oil pressure is generated from the cooling pressure which is, in any case, already lower.

In this connection, it is particularly advantageous if the lubricating oil line is connected to the outlet of a cooler.

As a result, cooled oil may be fed into the lubricating oil circuit. The oil circuit connected thereto may be used both for lubrication and for cooling purposes, and is accordingly branched.

According to a further preferred embodiment, the lubricating oil line is therefore connected to the roller controller and receives oil which has been displaced from the roller controller.

With this measure, the oil volume flow generated by the pump is utilized even more efficiently. As the roller control pressures in the roller controller generally are dynamically set by a volume flow, the utilization of this volume flow for the lubricating oil circuit is particularly advantageous from the point of view of efficiency.

According to an entirely preferred embodiment, the single pump of the hydraulic circuit is a hydrostatic pump.

As a result, the efficiency may be further improved as a lower hydraulic capacity is necessary.

Generally, it may be established that by means of the present invention clear advantages are created relative to the prior art. In particular, the individual secondary circuits for the individual functions such as the roller circuit, disk circuit, clutch circuit, etc. are hydraulically decoupled from one another. As a result, the optimization of the individual components of these circuits and their functions may be improved. No hydraulic interaction takes place.

Additionally, by means of the pressure controller cascade which is formed collectively, the respective hydraulic pressure which is particularly suitable for the respective necessary function may be optimally diverted.

Moreover, the advantages of the system of the prior art according to GB 2 369 164 A, as disclosed above, are maintained. This applies, in particular, to the possibility of setting up hydraulic end of travel damping in the roller actuators. The roller actuator may also be designed conventionally in the manner of a double-acting piston/cylinder arrangement.

It is understood that the aforementioned features and the features to be described below in further detail, may be used not only in the respective combination provided but also in other combinations or separately, without departing from the scope of the present invention.

BRIEF DESCRIPTION OF THE SEVERAL VIEWS OF THE DRAWING

Embodiments of the invention are described in more detail in the following description and shown in the drawings, in which.

DETAILED DESCRIPTION OF THE INVENTION

Figure 1:
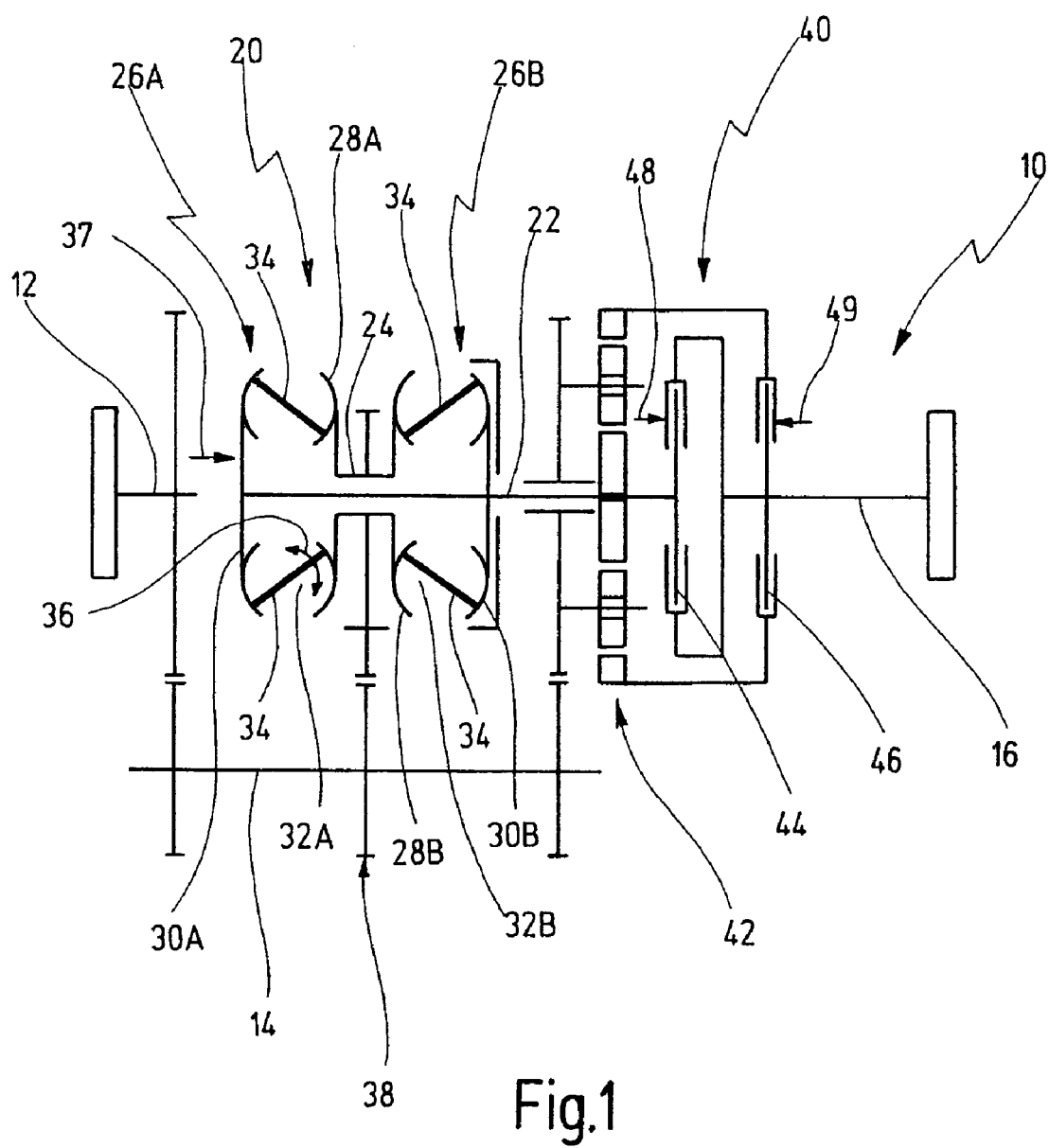
FIG. 1 is a schematic view of a toroidal transmission.

In FIG. 1 a schematically represented toroidal transmission is generally denoted by 10.

The toroidal transmission 10 comprises a transmission input shaft 12, a countershaft 14 and a transmission output shaft 16.

A variator arrangement of the toroidal transmission 10 is shown at 20. The variator arrangement 20 comprises a variator main shaft 22 and a variator secondary shaft 24. The variator arrangement 20 further contains two variators 26A, 26B.

Each variator 26A, 26B comprises a drive disk 28A and 28B, respectively, and an output disk 30A and 30B, respectively.

The drive disks 28A, 28B, together with the respective output disks 30A, 30B, encompass respective toroidal spaces 32A, 32B.

A plurality of rollers 34, generally three respective rollers 34, are respectively arranged in the toroidal spaces 32A, 32B, distributed over the periphery thereof.

The rollers 34 may be spatially adjusted by means of an actuator system, not shown in more detail, within the toroidal space 32, as is shown schematically at 36, in order to alter the transmission ratio of the variator arrangement 20. Thus it is understood that all the rollers 34 of the variators 26A, 26B are adjusted in the same direction, in order to be able to absorb uniformly the reactive forces occurring over the periphery of the variator arrangement 20.

It is shown at 37 that a disk of a variator is axially pressed. This contact pressure is provided by a disk actuator system. Generally one of the two disks 28, 30 of a variator 26 is pressed. However, both disks may also be pressed.

Although the arrows 36, 37 are shown merely with the variator 26A in FIG. 1, it is understood that a corresponding actuator system is also provided for the variator 26B.

A gear set is shown at 38 which connects the countershaft 14, as a type of constant, to the variator secondary shaft 24, to which the drive disks 28A, 28B are secured. The output disks 30A, 30B are secured to the variator main shaft 22, which is connected to a summing transmission 40.

The summing transmission 40 comprises a planetary gear set 42. The variator main shaft 22 is connected to the sun gear of the planetary gear set 42. The countershaft 14 is connected via a further gear set (not shown) to the planetary carriers of the planetary gear set 42.

The sun gear may be connected to the transmission output shaft 16 via a high-regime clutch (or first range clutch) 44. The ring gear of the planetary gear set 42 may be connected to the transmission output shaft 16 via a low-regime clutch (or second range clutch) 46.

At 48, an actuator system for the first range clutch 44 is shown schematically. At 49, an actuator system for the second range clutch 46 is shown schematically.

The mode of operation of the toroidal transmission 10 is generally known and is not disclosed here in detail for reasons of concise description.

Figure 2:
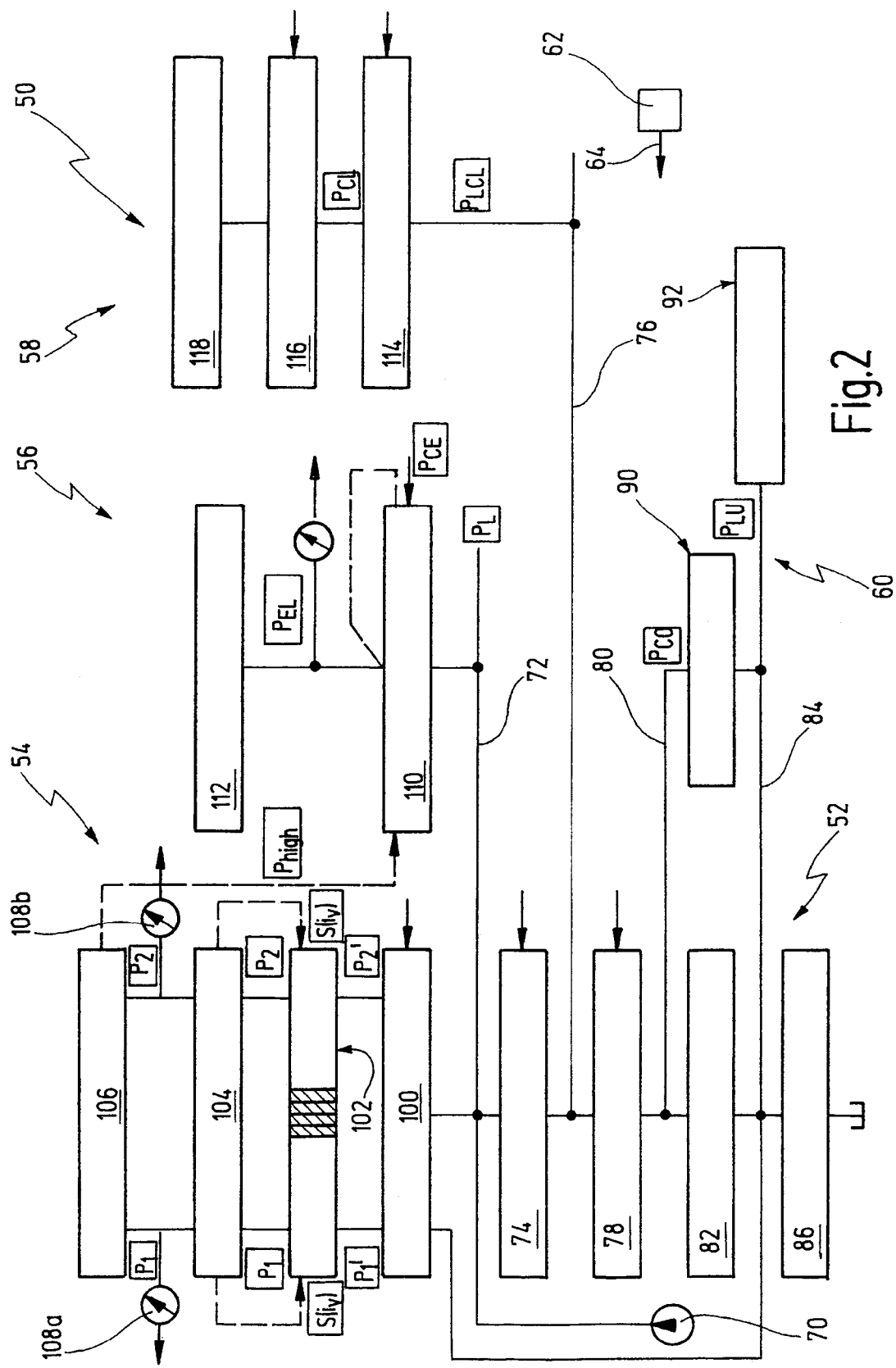
FIG. 2 is a block diagram of a hydraulic circuit according to a preferred embodiment of the invention.

In FIG. 2 an embodiment of the hydraulic circuit according to the invention is generally denoted by 50.

The hydraulic circuit 50 comprises a pressure control portion 52, a roller portion 54, a disk portion 56, a clutch portion 58 and a lubricating oil portion 60.

A central control device 62 is further provided for controlling the hydraulic circuit 50. Furthermore, the control device 62 serves as an interface to other control devices which, for example, may be provided in a vehicle, in which a toroidal transmission 10 is installed with the hydraulic circuit 50 according to the invention.

The control device 62 emits control signals 64 which are transmitted to individual devices of the portions 52 to 60. This is respectively shown by an arrow which points to the respective device still to be disclosed.

It is also possible, by means of the control device 62, to couple the individual portions 52 to 60 to one another in a controlled manner. Therefore, as is disclosed further below, a hydraulic coupling between the individual portions 52 to 60 is generally not provided.

The pressure control portion 52 comprises a single hydrostatic pump 70 which provides a hydrostatic oil pressure. The pump 70 is connected to a main line 72. The pressure of the main line 72 is regulated by means of a main pressure controller 74. The main line pressure regulated in this manner is denoted by $P_L$.

The pressure control portion 52 further comprises a clutch pressure controller 78. The clutch pressure controller 78 is subordinate to the main pressure controller 74 and generates from the main line pressure $P_L$ a clutch pressure $P_{LCL}$, which is lower than the main line pressure $P_L$. The clutch pressure $P_{LCL}$ is applied to a clutch line 76.

The pressure control portion 52 further comprises a cooler pressure controller 82. The cooler pressure controller 82 is subordinate to the clutch pressure controller 78 and generates a cooling pressure $P_{CO}$ from the clutch pressure $P_{LCL}$ and which is lower than $P_{LCL}$. The cooling pressure $P_{CO}$ is applied to a cooling line 80.

Finally, the pressure regulating portion 52 comprises a lubricating oil pressure controller 86. The lubricating oil pressure controller 86 is subordinate to the cooler pressure controller 82 and generates a lubricating oil pressure $P_{LU}$ from the cooling pressure $P_{CO}$. The lubricating oil pressure $P_{LU}$ is lower than the cooling pressure $P_{CO}$. The lubricating oil pressure $P_{LU}$ is applied to a lubricating oil line 84.

The lubricating oil line 84 is connected to a cooling/lubricating circuit 92 and supplies said cooling/lubricating circuit with lubricating oil for cooling/lubricating. The variators 26, the range clutches 44, 46, the gear sets, etc. of the toroidal transmission 10 are, amongst others, connected to the cooling/lubricating circuit 92.

The lubricating oil line 84 is further connected to an outlet of a cooler 90 which is connected on the input side to the cooling line 80.

The oil volume flow provided via the lubricating oil line 84 may be cooled via the cooler 90.

The lubricating oil line 84 is further connected to a roller controller 100. The oil which is not required there is fed into the lubricating oil line 84 and thus used for cooling/lubrication.

The roller controller 100 is part of the roller portion 54. The roller controller 100 is connected to the main line 72 and generates two roller control pressures $P_1'$ and $P_2'$ for a roller actuator 102. The roller actuator 102 is configured as a double-acting piston/cylinder arrangement with two oil chambers. The one roller control pressure $P_1'$ is applied to the one chamber, the other control pressure $P_2'$ is applied to the other chamber.

The roller actuator 102 may be a master piston/cylinder arrangement. In this connection, a hydraulically active end of travel damping ("hydraulic stop") is set up for the two directions in this roller actuator. As a result, i.e. when the end of travel of the roller actuator 102 is not reached, one respective volume flow generally takes place from the two chambers, the pressures of said volume flows being provided in FIG. 2 with $P_1$ and/or $P_2$.

These pressures go into an actuator chain 104, i.e. parallel in all subordinate ("slave") roller actuators, for the other rollers of the respective variator. As mentioned above, a variator 26 generally has three rollers 34 which all have to be adjusted in the same direction. As a result, one of the rollers is considered as a "master roller" and the activation of the other rollers is carried out subordinately thereto. This is indicated schematically by the "actuator chain" 104.

It is shown at 106 that the roller pressures $P_1$, $P_2$ are monitored by a logic controller. At 108a and 108b, control pressure measuring devices are shown, which measure the roller pressures $P_1$ and $P_2$ and forward the measuring signals for monitoring purposes, for example to the higher-ranking control device 62.

It is further shown that feedback occurs between the actuator chain 104 and the "master" roller actuator 102 as is indicated by dotted arrows, marked as "$S(i_v)$".

The roller actuators 102, 104 are pressure controlled by a dynamically flowing oil flow. The oil flow on the output side is fed into the lubricating oil line 84.

It is understood that the master roller actuator 102 may be provided with an internal bypass valve for equalizing pressure differences as a result of applied movements and for setting the system damping. The roller actuators 102, 104 and the variator 34 configured therewith are, as a result, technically considered to be reliable.

The disk portion 56 comprises a disk controller 110. The disk controller 110 is connected to the main line 72 and, as a result, is located parallel to the roller controller 100. In the disk controller 110, a disk control pressure $P_{EL}$ is generated, which is supplied to a disk actuator 112.

The disk controller 110 also receives a further pressure, namely a pressure $P_{high}$, as an input. This pressure $P_{high}$ is the greater of the two roller pressures $P_1$, $P_2$.

Finally, a pressure control function is provided in the disk controller 110, as is indicated by a dotted line and the pressure $P_{CE}$.

The disk control pressure $P_{EL}$ is measured and used for control and/or regulating purposes, for example in the control device 62.

The clutch portion 58 comprises a clutch control device 114. The clutch control device 114 is connected to the clutch line 76 and is supplied with the clutch pressure $P_{LCL}$.

The clutch control device 114 generates a clutch control pressure $P_{CL}$ therefrom, which is used for actuating a clutch actuator 118. The clutch actuator 118 may also contain a plurality of actuators, for independently controlling the range clutches 44, 46 of the toroidal transmission 10.

A shut-off valve 116 is connected between the clutch control device 114 and the clutch actuator 118. This shut-off valve 116 is a safety valve which, for example, carries out a "safe function" when the electronics fail. In this connection, the range clutches 44, 46 are opened and thus a safe state is established.

As a whole, with the hydraulic circuit 50 according to the invention, at least one of the following advantages may be achieved:

At a hydraulic capacity level, hydraulic interaction is avoided.

The pressure ratio between the roller control pressures $P_1'$, $P_2'$ and the disk control pressure $P_{EL}$ is not a fixed ratio predefined by the geometry.

The filling and closing pressures of the range clutches 44, 46 may be modulated.

The filling and closing pressures may be designed to be switched.

The hydraulic losses are low.

A high maximum adjustment speed of the roller system results.

Furthermore, the displaced and adjusting volume flows do not overlap.

Good functionality is ensured, even at low temperatures.

Only one pump is required.

The filling times of the range clutches are short as a result of the controllable filling pressure.

Due to the use of a hydrostatic pump, the required hydraulic capacity is therefore low.

The efficiency is optimized by active control or regulation of the disk control pressure $P_{EL}$, on the basis of a line pressure.

High operational reliability is further achieved by basic control of the disk control pressure, on the basis of the higher main line pressure $P_L$.

Individually controlled pressure circuits are provided for the variator, the range clutches as well as the cooling and the distribution of the cooling oil/lubricating oil. This decouples the hydraulic systems and allows the individual systems and their functionality to be optimized.

Oil which is not required in the variator control system is used for cooling.

All the oil delivered by the pump is used (apart from a possible reduction at high speeds).

Higher adjustment speeds are possible at a lower pump capacity.

What is claimed is:

1. A hydraulic circuit for a toroidal transmission with:
   a single pump,
   a main pressure controller which is connected to the pump for generating a main line pressure in a main line,
   a roller controller which is connected to the main line, two roller control pressures being generated in the roller controller from the main line pressure,
   at least one hydraulic roller actuator for spatial adjustment of a roller in a toroidal space which is set up by two disks, the roller actuator being connected to the roller controller,
   a disk controller which is connected to the main line, a disk control pressure being generated in the disk controller from the main line pressure,
   at least one hydraulic disk actuator for axially adjusting at least one of the disks, the disk actuator being connected to the disk controller,
   a clutch pressure controller which generates a clutch pressure in a clutch line from the main line pressure,
   a cooler pressure controller which generates a cooling pressure in a cooling line from the clutch pressure, and
   a cooler which is connected to the cooling line.

2. The hydraulic circuit as claimed in claim 1, with a clutch control device which is connected to the clutch line, a clutch control pressure being generated in the clutch control device from the clutch pressure.

3. The hydraulic circuit as claimed in claim 2, with at least one hydraulic clutch actuator for actuating at least one range clutch, the clutch actuator being connected to the clutch control device.

4. The hydraulic circuit as claimed in claim 1, with a lubricating oil pressure controller which generates a lubricating oil pressure in a lubricating oil line from the cooling pressure.

5. The hydraulic circuit as claimed in claim 4, the lubricating oil line being connected to the outlet of a cooler.

6. The hydraulic circuit as claimed in claim 4, the lubricating oil line being connected to the roller controller and receiving oil which has been displaced from the roller controller.

7. The hydraulic circuit as claimed in claim 1, the pump being a hydrostatic pump.

* * * * *